(12) United States Patent
Jennings et al.

(10) Patent No.: US 6,263,136 B1
(45) Date of Patent: Jul. 17, 2001

(54) INTELLIGENT OPTICAL TRANSMITTER MODULE

(75) Inventors: Mark Richard Jennings, Andover; Frank Salvatore Leone, Berkeley Heights; Richard Joseph Pimpinella, Hampton, all of NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/430,548

(22) Filed: Oct. 29, 1999

(51) Int. Cl.[7] ............................................. G02B 6/26
(52) U.S. Cl. ........................ 385/48; 385/16; 385/24; 385/134
(58) Field of Search ................. 385/48, 15, 16, 385/24, 39, 134–139

(56) References Cited

U.S. PATENT DOCUMENTS 5,712,942 * 1/1998 Jenning et al. ..................... 385/134
5,724,468 * 3/1998 Leone et al. ........................ 385/134
6,088,497 * 7/2000 Phillips et al. ....................... 385/48

* cited by examiner

Primary Examiner—Phan T. H. Palmer
(74) Attorney, Agent, or Firm—Gibbons, Del Deo Dolan, Griffinger & Vecchione (57) ABSTRACT

The present invention is an intelligent optical transmitter module that is used to produce optical test signals. The optical transmitter module contains a solid state laser and a microprocessor. The solid state laser produces the test signals which are used to test optical fibers in an optical fiber network. The laser is both monitored by and controlled by the microprocessor. In one embodiment, backface monitoring and optical output coupling power monitoring (using an optical tap) are accomplished within the module in order to more accurately reflect the state of the laser. The microprocessor reads data regarding the performance of the solid state laser which may be output to another control device. The control device utilizes the data from the microprocessor in the analysis of fiber optic loop conditions as well as the laser itself. The microprocessor enables the output levels of the solid state laser to be adjustable by way of a digital to analog converter. The test signal which is output from the module may additionally be pulsed or continuous.

30 Claims, 5 Drawing Sheets

INTELLIGENT OPTICAL TRANSMITTER MODULE

RELATED APPLICATIONS

This application is related to the following co-pending U.S. Patent Applications:

U.S. patent application Ser. No. 09/374,169, entitled, SYSTEM AND METHOD FOR MONITORING OPTICAL FIBER INTEGRITY BETWEEN THE TELECOMMUNICATIONS PROVIDER AND A CUSTOMER'S PREMISES, filed Aug. 13, 1999; and U.S. patent application Ser. No. 09/430,640, entitled, MONITOR MODULE FOR A FIBER OPTIC SYSTEM, filed Oct. 16, 2000.

BACKGROUND OF THE INVENTION

1. Field of the Invention

The present invention relates to optical transmitter devices that are used to transmit test signals across optical fibers in an optical fiber network. More particularly, the present invention relates to optical transmitter devices that are used in fiber administration systems to test the integrity of optical fibers connected to that system.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, equipment is used at the central office to organize various optical fibers in the optical fiber network. In certain optical networks, the optical fibers at the central office are is connected to dedicated pieces of equipment, such as optical signal transmitters, that serve only one purpose.

If the optical fibers are to be connected to another piece of equipment, such as test equipment, the optical fibers must be manually connected to that new piece of equipment.

In more sophisticated applications, optical fibers are terminated at fiber administration systems at the central office. Fiber administration systems enable many different types of equipment to be connected to the optical fibers without having to reroute the optical fibers from their point of termination.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein.

Each optical distribution frame located at the central office typically defines a plurality of bays, wherein each bay houses several different types of dedicated equipment shelves. One type of dedicated equipment shelf contained within a fiber distribution system is a fiber distribution shelf. Located within fiber distribution shelves are optical connection ports that receive the ends of all of the individual optical fibers that enter the central office and are contained within the optical fiber network. By terminating each optical fiber at an optical connection port on one of the different fiber distribution shelves, the location of each optical fiber becomes known within the overall assembly. Once terminated at a known address on one of the fiber distribution shelves, each optical fiber can be selectively coupled to a variety of other types of equipment contained within other shelves of the fiber distribution system.

At the opposite end of the various optical fibers are the customers of the telecommunications provider. For customers having smaller scale telecommunications needs, the optical signals transmitted on the optical fiber network are converted to electrical signals prior to termination of the customer premises in a traditional manner. As such, the entire optical network is controlled and maintained by the telecommunications provider. However, with customers that have large-scale telecommunication requirements, it is not uncommon for the telecommunications provider to run a pair of optical fibers from the optical network directly into the customer premises. One fiber is used to receive signals from the telecommunications provider and the other fiber is used to send signals to the telecommunications provider.

In either case, the dependence upon optical fibers in today's telecommunications networks is substantial. Because of the increased dependence upon the use of optical fibers, an increased importance has also been placed on the testing and monitoring of optical fibers in order to ensure proper operation.

In the past, the testing and monitoring of optical fibers has required the deployment of a stable optical light source, i.e., a laser, which has typically been embodied in a cumbersome piece of test equipment. Output levels of the laser are typically measured via a backface monitoring technique, as would be understood to persons skilled in the art. A drawback to tracking the output laser power using only the backface monitoring technique is that this technique does not always accurately reflect the laser power which has been output over the optical fiber. This may be due, for example, to temperature variations between the optical fiber and the laser apparatus which can cause slight misalignments to occur between the optical fiber and the laser, which is sometimes referred to as creeping.

Accordingly, there is need for a more efficient and reliable manner in which to test and/or continuously monitor the integrity of optical fibers that are deployed in an optical communications network.

SUMMARY OF THE INVENTION

The present invention is an intelligent optical transmitter module that is used to produce optical test signals. The optical transmitter module contains a solid state laser and a microprocessor. The solid state laser produces the test signals which are used to test optical fibers in an optical fiber network. The laser is both monitored by and controlled by the microprocessor. In one embodiment, backface monitoring and optical output coupling power monitoring (using an optical tap) are accomplished within the module in order to more accurately reflect the state of the laser.

The microprocessor reads data regarding the performance of the solid state laser which may be output to another control device. The control device utilizes the data from the microprocessor in the analysis of fiber optic loop conditions as well as the laser itself. The microprocessor enables the output levels of the solid state laser to be adjustable by way of a digital to analog converter. The test signal which is output from the module may additionally be pulsed or continuous.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
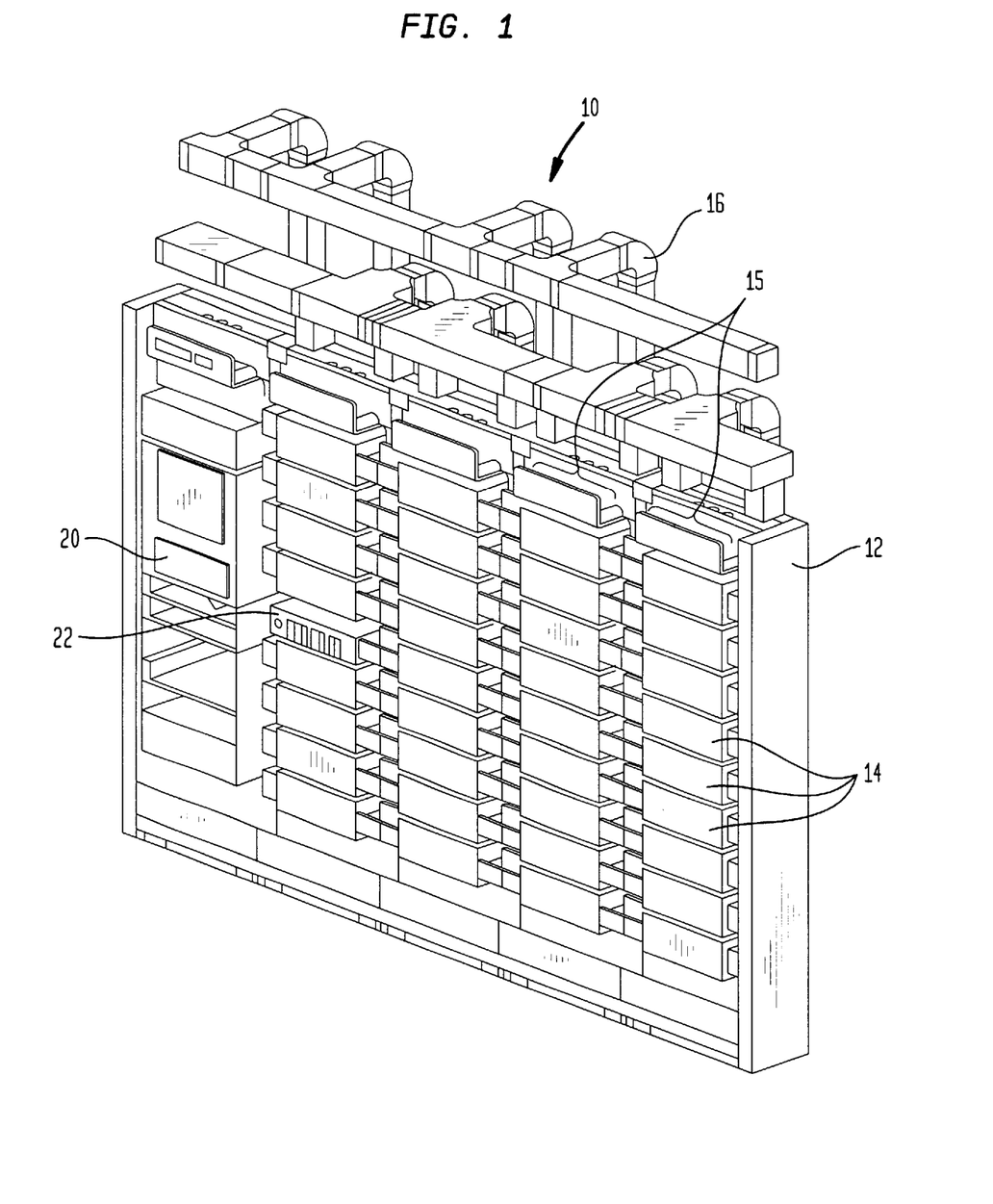
FIG. 1 is a perspective view of an optical fiber administration system containing a first plurality of bays and a second plurality of shelves in each bay.

In FIG. 1, a fiber administration system 10 is shown. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of different shelves 14. The different shelves 14 come in one of three standard sizes, having a five inch height, a seven inch height or a nine inch height. A network of conduits 16 lead the various optical fibers from the optical fiber network to the fiber distribution shelves 14. Contained within those conduits 16 are the different dedicated pairs of optical fibers that are dedicated to different customer facilities.

In addition to the different shelves, the fiber administration system also includes a systems controller 20. The systems controller 20 runs the software that controls the fiber administration system 10.

Contained within the fiber administration system 10 is at least one monitoring shelf 22 which may include monitoring equipment such as the intelligent optical transmitter module of the present invention.

Figure 2:
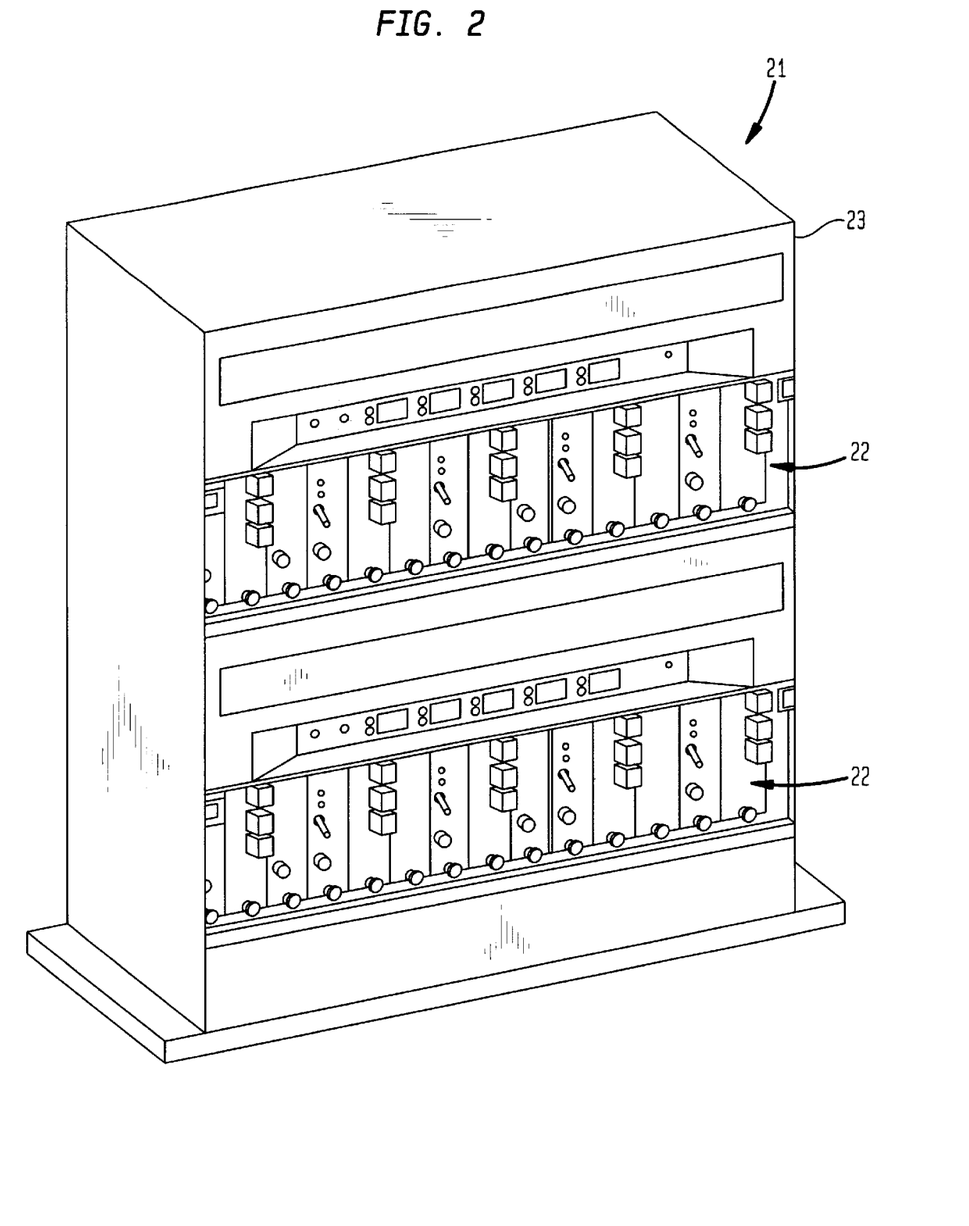
FIG. 2 is a perspective view of a dedicated piece of equipment containing intelligent optical transmitter modules of the present invention.

Not every optical fiber system uses a fiber administration system such as that shown in FIG. 1. Accordingly, in such systems, monitoring shelves cannot be simply added to the structure of the fiber administration system. In such applications, the monitoring shelves can be built into a self-contained piece of equipment. Referring to FIG. 2, such a dedicated piece of equipment 21 is illustrated. In FIG. 2, a small frame 23 is provided. The small frame 23 retains at least one monitoring shelf 22. In optical fiber networks that do not use fiber administration systems, the small frame 23 can be brought into the telecommunication provider's facility and the optical fibers of the optical fiber network can be manually interconnected with the monitoring shelves 22.

As stated previously, the monitoring shelves may include monitoring equipment such as an intelligent optical transmitter module which is the subject of the present invention. Other monitor modules may be deployed as well to receive transmissions from the optical transmitter modules.

Figure 3:
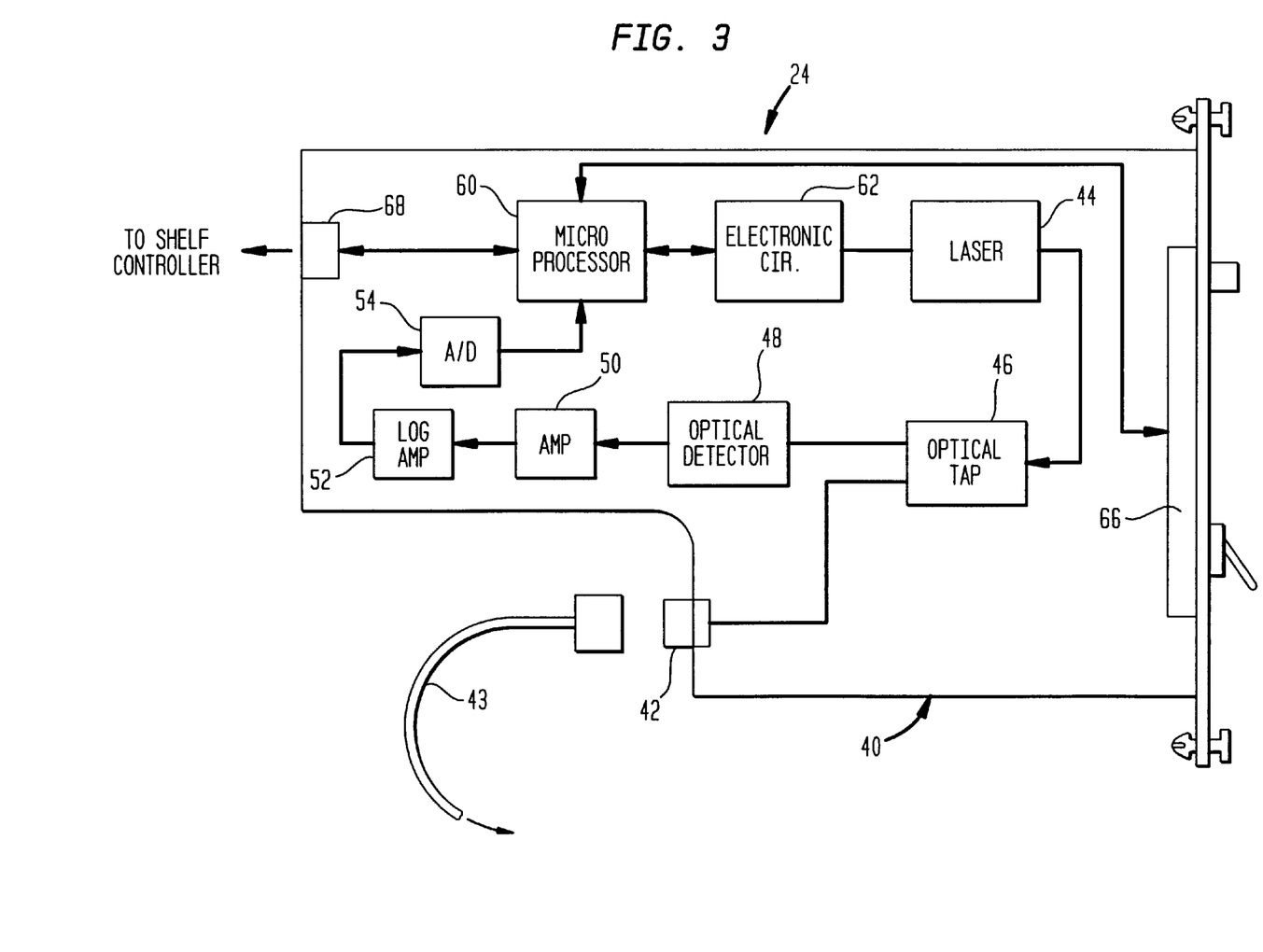
FIG. 3 is a schematic view of an exemplary embodiment of an optical transmitter module in accordance with the present invention.

The structure of the present invention intelligent optical transmitter module 24 is best described by now referring to FIG. 3. In FIG. 3, it can be seen that the optical transmitter module 24 is contained within a module housing 40. The module housing 40 is sized to fit within a monitoring shelf 22 (FIG. 1, FIG. 2) within the fiber administration system 10, for example. The modular housing 40 is generally rectangular in shape having a relief at the lower rear corner of the rectangle. An optical output port 42 enters the modular housing 40 within the area of the relief. The area of the relief is required to provide the needed room to curve an incoming optical fiber 43 and engage the optical output port 42 within the confines of the monitoring shelf 22 (FIG. 1).

In FIG. 3, it can be seen that the optical transmitter module 40 contains a solid state laser 44, for example, a 1550 nm stabilized light source. The output of the solid state laser 44 is directly coupled to the output port 42 of the optical transmitter module 24. An optical tap 46 is disposed between the solid state laser 44 and the output port 42. The optical tap 46 directs a small portion of the optical energy from the output of the solid state laser 44 to an optical detector 48.

The optical detector 48 creates an analog electrical signal in response to the light received from the optical tap 46. The analog electrical signal is passed through both a pre-amplifier 50 and a logarithmic amplifier 52 to both amplify and linearize the analog electrical signal. The analog signal is then converted to a digital signal using an analog-to-digital converter 54.

A microprocessor 60 is contained within the optical transmitter module 24. The microprocessor 60 receives digital signals from the analog-to-digital converter 54. As such, the microprocessor 60 is capable of directly monitoring the output of the solid state laser 44 in real time.

The microprocessor 60 within the optical transmitter module 24 is also coupled to electronic control circuitry 62 of the solid state laser 44. As such, the microprocessor 60 is capable of controlling the operational power of the solid state laser 44, and thus the output power of the solid state laser 44. The present invention offers an advantage over the prior art in that it is capable of measuring not only the backface monitor power, but also the coupling power which is output from the laser 44. This is important because through these monitoring capabilities, a constant output power level from the module can be guaranteed. Accordingly, if the output levels of the laser are precisely known, and a problem occurs with a transmission in an optical fiber, then the problem can be easily isolated to either the fiber optic cable or the laser mechanism.

Figure 4:
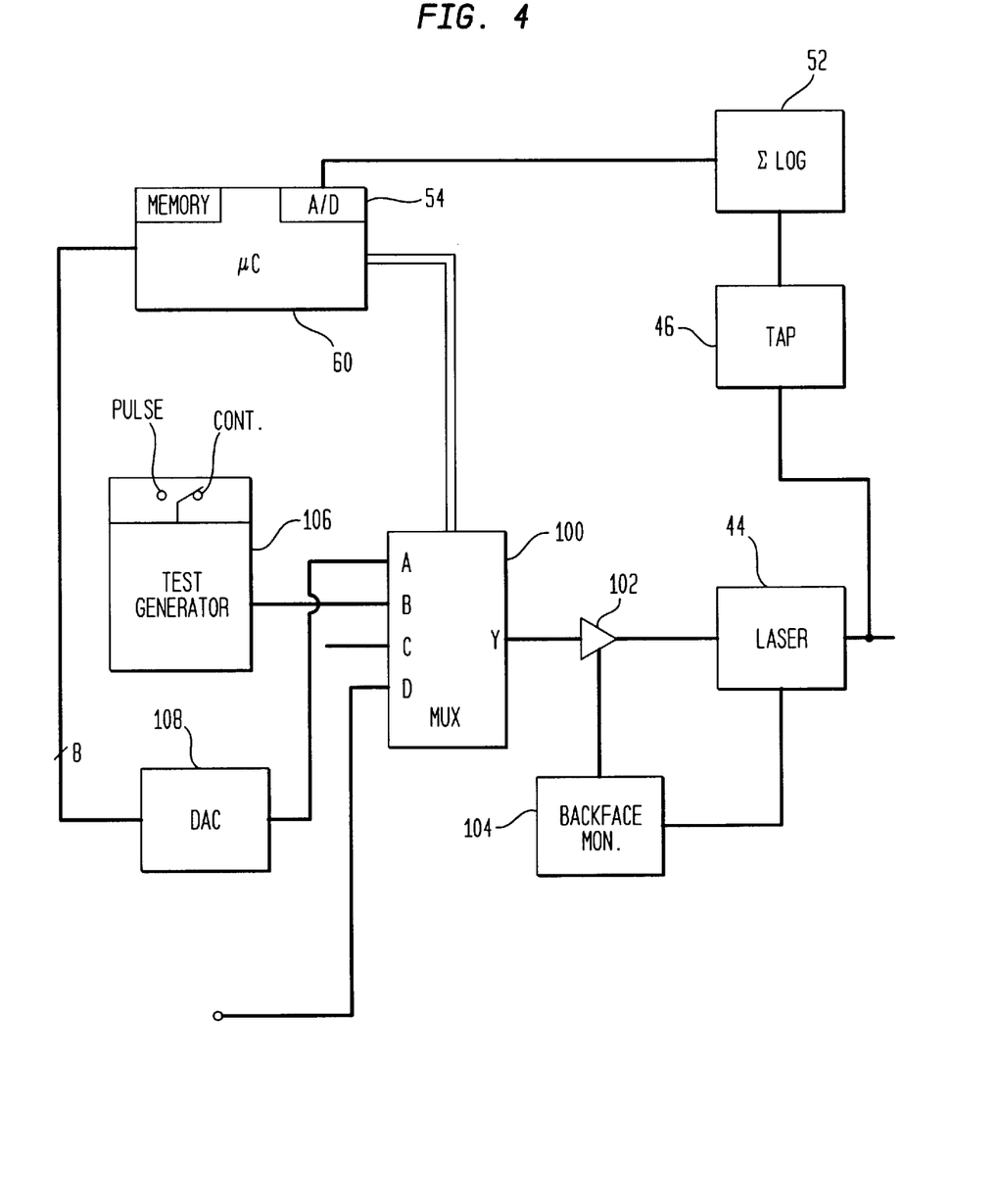
FIG. 4 is a more detailed schematic view of an exemplary embodiment of an optical transmitter module in accordance with the present invention.

Referring to FIG. 4, a functional block diagram of the optical transmitter is shown, wherein the electronic control circuitry 62 of the module is shown in greater detail. As shown, the microprocessor 60 is coupled to a multiplexer device 100 which in the exemplary embodiment is capable of selecting one of four inputs A,B,C,D to be included on output line Y. Output line Y is coupled to an amplifier 102 which in turn has its output coupled to the laser 44. A backface monitor circuit 104 couples to the amplifier 102 and to the laser 44 in order to monitor the backface monitor output power of the laser 44. As discussed previously, the backface monitor circuit 104 may also be coupled directly to the microprocessor 60 in order to monitor and/or modify output power levels of the laser 44.

The multiplexer 100 of the electronic control circuitry includes four inputs, although a person skilled in the art would recognize that any number of multiplexer inputs can be utilized. As shown, input B of the multiplexer 100 is coupled to a test signal generator 106, for example to produce a 2 kHz test signal, which when selected is output from the laser and in turn the transmitter module. The test signal generator 106 can be directed by the microprocessor to output either a pulsed or continuous wave test signal. Input C of the multiplexer 100 when selected directs the laser to output continuous wave full power.

Input A of the multiplexer couples to the microprocessor through a digital to analog converter (DAC) 108. The DAC 108, based on the digital input from the microprocessor, is capable of outputting a large number of precisely varying output levels, e.g. $2^8$, to the multiplexer in order to control the output power of the laser 44. In this way the output power of the laser 44 can be specifically tailored to the receiving electronics without the use of attenuators. Input D of the multiplexer couples to an input port on the module 44 which can accept an external input signal for transmission over the fiber cable. In this way, the intelligent optical transmission module 24 may be used in a communication mode as well as a test and monitor mode.

As a result of the monitoring capabilities of the microprocessor 60, the intelligent optical transmitter module 24 is capable of producing alarms in response to the laser output level falling below a given threshold level. The module produces a local visual and/or audible alarm as well as an alarm message to be transmitted to a systems controller 20 if the module is used within a fiber administration system. As would be understood, since the output power levels of the module are adjustable, the alarm threshold is also adjustable. The optical output monitoring capability of the module as performed by the microprocessor is additionally useful in that statistical information regarding the laser's output may be compiled for processing by, for example, the fiber administration system. Such statistical processing is valuable for use in analysis of event occurrences within the fiber optic communications network and can also be used to predict the life of the laser itself.

As was mentioned previously, the transmitter module of the present invention may be used within a fiber administration system 10 of the type described in FIG. 1. In that case, the transmitter module 24 and other associated modules may be controlled by the systems controller 20 of the fiber administration system 10. This further allows data collected at the transmitter module to be transmitted to and processed by the systems controller for use by the fiber administration system. Accordingly, this provides a means of collecting and correlating information with regard to individual fibers which are coupled to the fiber administration system. As discussed, this information may be used to provide statistical analysis with respect to individual communications channels. In addition, when the transmitter module is used with a fiber administration system, certain modules may be physically located at the fiber administration system while other modules may be remotely located, e.g., the monitor modules. In this case, the information which is collected at the remote location may be transmitted back to the fiber administration system in a client server type fashion in which case client server type communication devices would be utilized in order enable communications between the two locations.

An additional feature of the intelligent optical transmitter module 24 is that through the inclusion of non-volatile memory, e.g., EEPROM or other like ROM or RAM device understood to a person skilled in the art, which is factory pre-programmed, the modules are made to be self aware upon initial power up. That is, individual modules are given an identity at the factory which may include, among other things, module type, code version, serial number, manufacturing date, firmware version, connector type, calibration data, wavelength data and number of channels data. Accordingly, when used in a compatible fiber administration system, the module will be automatically identified to the system controller or shelf controller upon initial power up and after any power outages or subsequent power ups.

Referring again to FIG. 3, it will be understood that since the microprocessor 60 both monitors the output of the solid state laser 44 and controls the output of the solid state laser 44, the microprocessor 60 can make active changes to the solid state laser 44 that cause the solid state laser 44 to operate at its optimum level in a feedback type fashion. For example, if the solid state laser 44 has a certain acceptable range of operational power, the microprocessor 60 can cause the laser 44 to operate at the midpoint of that range regardless of changing operational variables, such as changing temperature.

Since the microprocessor 60 controls the input power of the solid state laser 44 and measures the output power of that laser 44, the microprocessor 60 is capable of determining the efficiency of the laser 44. Similarly, the microprocessor 60 can determine the degree of degradation in a signal caused by the laser 44 itself. If the solid state laser 44 fails or if the performance of the laser 44 falls outside a predetermined range, the microprocessor 60 immediately senses that condition and signals an alarm.

The optical transmitter module 24 also contains a manual control interface 66. The manual control interface 66 contains various buttons and switches that enable the optical transmitter module 24 to be activated and controlled manually by a technician. The manual control interface 66 is connected microprocessor 60. The microprocessor 60 is connected to the shelf controller or systems controller 20 (FIG. 1) through a connector port 68 at the rear of the optical transmitter module 24. Accordingly, the manual control interface 66 can be controlled by the systems controller through the microprocessor 60. The systems controller 20 (FIG. 1) can therefore be used to deactivate the manual control interface 66 to prevent unauthorized or untrained tampering with the optical transmitter module 24.

Figure 5:
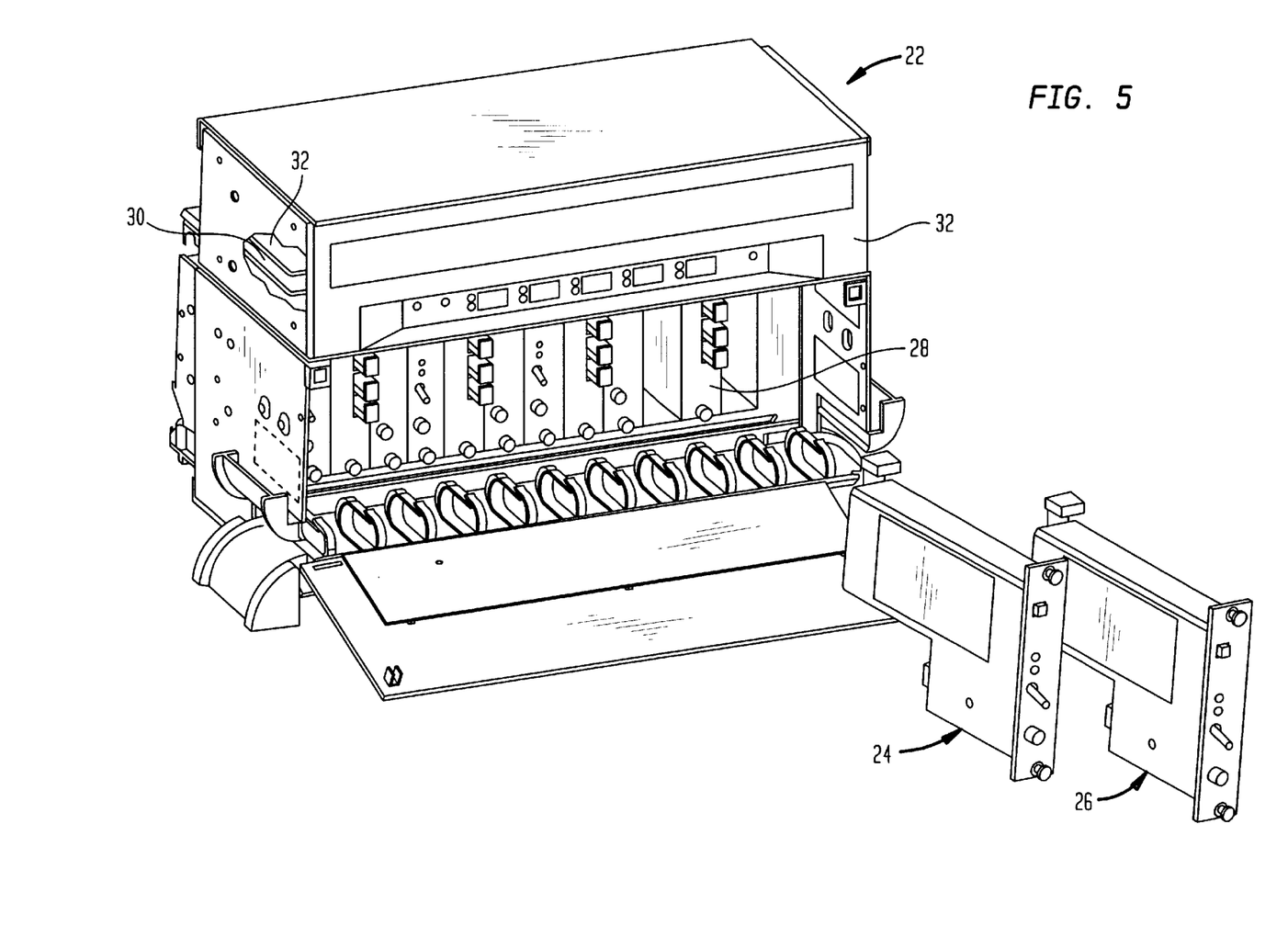
FIG. 5 is an exploded perspective view of a loop back monitoring shelf containing an exemplary embodiment of an optical transmitter module.

One application for use of the intelligent optical transmitter module 24 of the present invention is for loop back monitoring of a fiber line to customer premises equipment. In such an application, the optical transmitter module will likely be included within loopback monitoring shelves. Regardless of whether the loop back monitoring shelves are part of a larger fiber administration system or are self-contained, the function and structure of the loop back monitoring shelves remain the same. Referring to FIG. 5, it can be seen that the loop back monitoring shelf 22 supports matched sets of modules. The matched sets of modules include an optical transmitter module 24, a monitor module 26 and a wavelength division multiplexing module 28. The two dedicated optical fibers that lead to a specific customer premises are coupled to the matched set of modules, wherein the outgoing optical fiber connects to the optical transmitter module 24 and the incoming optical fiber connects to the monitor module 26.

The loop back monitoring shelf 22 contains a shelf controller 30. The shelf controller 30 is a programmable computer control that is compatible with the systems controller 20 (FIG. 1) of the overall fiber administration system 10 (FIG. 1). The shelf controller 30 gathers information from both the optical transmitter module 24 and the monitor module 26 for use in the statistical analysis and the continued operation of the loop back monitoring shelf 22 within the fiber administration system 10 (FIG. 1). In a unit as shown in FIG. 5, the loop back monitoring shelf also includes a systems controller 32.

For each optical fiber pair, that is joined to the loop back monitoring shelf 22, a matched set of modules is provided. As has been previously stated, the matched set of modules includes a wavelength division multiplexing module 28, a monitor module 26 and an optical transmitter module 24. The structure of the wavelength division multiplexing module 28 is known in the field of fiber administration systems and is therefore not set forth in detail in this document. The structure of the monitor module 24 is disclosed in related co-pending U.S. patent application Ser. No. 09/430,640, entitled Monitor Module For A Fiber Optic Monitoring System, and filed Oct. 16, 1999, the disclosure of which is incorporated into this application by reference.

It will be understood that the embodiments of the present invention system and method specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. An optical transmitter module assembly, comprising:
   a housing sized to fit within a shelf in a fiber administration system, said housing having a front surface and a rear surface;
   a solid state laser contained within said housing, wherein said solid state laser produces an optical output signal;
   an optical monitor within said housing for monitoring said optical output signal;
   an optical output port accessible on the exterior of said housing, wherein said optical output signal is internally directed to said optical output port; and
   a microprocessor disposed within said housing, said microprocessor being connected to both said optical monitor and said solid state laser, wherein said microprocessor monitors said solid state laser utilizing said optical output signal detected by said optical monitor.

2. The assembly according to claim 1, further including an optical tap disposed within said housing, wherein said optical tap taps a portion of said optical output signal as said optical output signal travels from said solid state laser to said optical output port.

3. The assembly according to claim 1, further including a backface monitor circuit for monitoring said output signal produced from said laser, said backface monitor circuit being coupled to said microprocessor.

4. The assembly according to claim 1, wherein said optical monitor produces an analog electrical signal that corresponds to said optical output signal received by said optical monitor.

5. The assembly according to claim 4, further including a logarithmic amplifier, coupled to said optical monitor for linearizing said analog electrical signal.

6. The assembly according to claim 5, further including an analog-to-digital converter, coupled to said logarithmic amplifier and said microprocessor, wherein said analog-to-digital converter converts said analog electrical signal into a digital signal that is read by said microprocessor.

7. The assembly according to claim 1, wherein said microprocessor is operable to maintain said laser in a predetermined operational range.

8. The assembly according to claim 1, further including an electrical connector port accessible on said housing, wherein said electrical connector port is coupled to said microprocessor.

9. The assembly according to claim 8, further including manual controls on said front surface of said housing, wherein said manual controls are coupled directly to said electrical connector port.

10. The assembly of claim 1, wherein output power levels of said laser are adjustable as selected by said microprocessor.

11. The assembly of claim 10, further including a multiplexer circuit coupled to said microprocessor for selecting one of a number of inputs to control the output of said laser.

12. The assembly of- claim 11, further including a digital to analog converter coupled between said microprocessor and one input of said multiplexer for controlling output power levels of said laser.

13. The assembly of claim 11, wherein said inputs are selected from the group consisting of test signal generator, digital to analog converter, full power indicator and external input.

14. The assembly of claim 1, further including a memory element having factory programmed identity parameters, wherein said transmitter module outputs said identity parameters upon power up when said module is used within a fiber administration system or loop back monitoring system.

15. In a fiber administration system having shelves for retaining a plurality of different modules, an optical transmitter module, comprising:
   a module housing sized to fit within one of the shelves of the fiber administration system;
   an optical output port accessible on said module housing;
   a laser disposed within said module housing, wherein said laser produces an optical signal that is emitted out of said module housing through said optical output port;
   a microprocessor control internal to said module housing that monitors said optical signal and which may vary an output laser signal in response to commands generated from said microprocessor.

16. The module according to claim 15, further including an optical monitor within said module housing for monitoring an optical signal produced from said laser.

17. The module according to claim 16, wherein said microprocessor adjusts said laser in response to said optical signal detected by said optical monitor.

18. The module according to claim 17, further including an optical tap, disposed within said housing, wherein said optical tap taps a portion of said optical output signal as said optical output signal travels from said laser to said optical output port.

19. The module according to claim 16, wherein said optical monitor produces an analog electrical signal that corresponds to said optical output signal received by said optical monitor.

20. The module according to claim 19, further including a logarithmic amplifier, coupled to said optical monitor for linearizing said analog electrical signal.

21. The module according to claim 20, further including an analog-to-digital converter, coupled to said logarithmic amplifier and said microprocessor, wherein said analog-to-digital converter converts said analog electrical signal into a digital signal that is read by said microprocessor.

22. The module according to claim 15, further including a backface monitor circuit for monitoring said output signal produced from said laser, said backface monitor circuit being coupled to said microprocessor.

23. The module of claim 15, wherein output power levels of said laser are adjustable as selected by said microprocessor, further including a multiplexer circuit coupled to said microprocessor for selecting one of a number of inputs to control the output of said laser.

24. The module of claim 23, further including a digital to analog converter coupled between said microprocessor and one input of said multiplexer for controlling output power levels of said laser.

25. The module of claim 23, wherein said inputs are selected from the group consisting of test signal generator, digital to analog converter, full power indicator and external input.

26. The module of claim 15, further including a memory element having factory programmed identity parameters, wherein said transmitter module outputs said identity parameters upon power when said module is used within a fiber administration system or loop back monitoring system.

27. The module of claim 15, wherein said module couples to a systems controller of said fiber administration system, said module being operable to communicate with said systems controller, whereby information pertaining to specific optical fibers which couple to one or more modules may be correlated at said fiber administration system.

28. A fiber administration system for an optical fiber network, comprising:

a frame defining at least one bay;

shelves on each said bay, wherein said shelve include at least one monitoring system shelf;

a shelf controller disposed on each said monitoring system shelf;

at least one optical transmitter module retained on each said monitoring system shelf, wherein each optical transmitter module is optically coupled to an optical fiber pathway in the optical fiber network, and wherein said optical transmitter module transmits an optical test signal used to measure signal losses in said optical fiber pathway of the optical fiber network.

29. The system according to claim 28, wherein each said optical transmitter module contains a laser from producing said optical test signal and a microprocessor that monitors both the performance of said laser and said optical test signal.

30. The system according to claim 29, wherein said shelf controller is coupled to said microprocessor of each optical transmitter module.

* * * * *